Sept. 2, 1941.  E. A. WODRICH  2,254,465
COW TAIL HOLDER
Filed Aug. 28, 1939
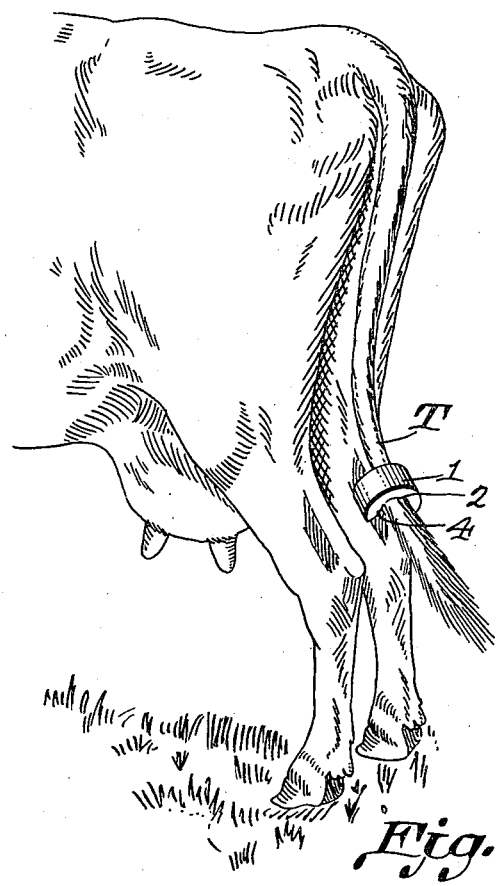
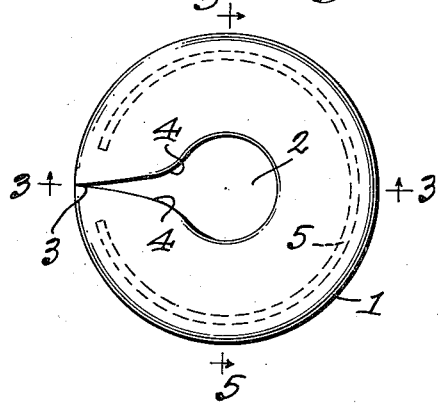
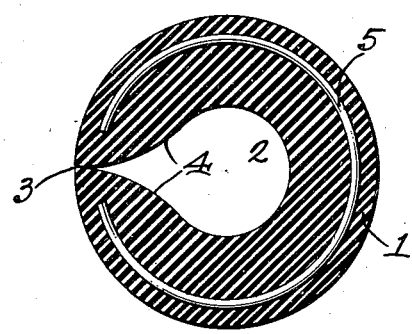
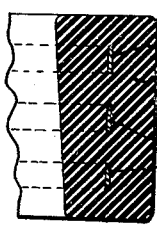
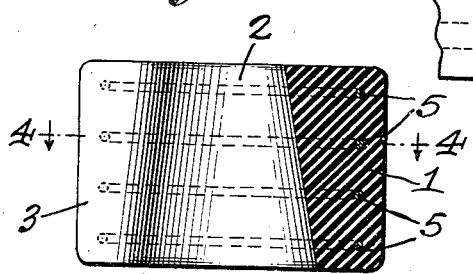
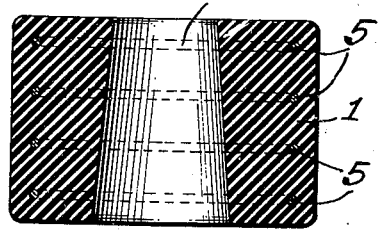
Edwin A. Wodrich
INVENTOR.
BY C. A. Snow & Co.
ATTORNEYS.

Patented Sept. 2, 1941

2,254,465

UNITED STATES PATENT OFFICE 2,254,465

COW TAIL HOLDER

Edwin Albert Wodrich, Alden, Minn.

Application August 28, 1939, Serial No. 292,334

1 Claim. (Cl. 119—105)

This invention relates to a cow tail holder designed for attaching the free end portion of the tail to one of the legs of the cow so that, during the milking operation, the tail will not be switched.

A further object is to provide a holder in the form of a clip which will embrace the tail and can also be used to yieldingly grip the leg of the cow close to and above the hock of one of the hind legs, there being suitable reenforcing means within the clip concealed and protected from the elements by an outer covering of soft resilient material.

Another object is to provide a cow tail holder which is formed in one piece and can be readily placed in or removed from position.

With the foregoing and other objects in view which will appear as the description proceeds, the invention consists of certain novel details of construction and combination of parts hereinafter more fully described and pointed out in the claim, it being understood that changes may be made in the construction and arrangement of parts without departing from the spirit of the invention as claimed.

In the accompanying drawing the preferred forms of the invention have been shown.

In said drawing:

Figure 1 is a perspective view of the device in use.

Figure 2 is a plan view of the holder.

Figure 3 is a section on line 3—3 of Figure 2.

Figure 4 is a section on line 4—4 of Figure 3.

Figure 5 is a section on line 5—5 of Figure 2.

Figure 6 is a section through a portion of a slightly modified form of holder.

Referring to the figures by characters of reference I designates the body of the holder which is preferably cylindrical and formed of soft rubber. In the center of the body there is provided an opening 2 which is tapered upwardly and extends entirely through the body. The body is slit from top to bottom as shown at 3 and the walls of the slit merge along diverging curved lines into opposed portions of the wall of the opening 2, as is indicated at 4. Thus the opening, in transverse section is tear-shaped.

The body is reenforced by means of superposed resilient members 5 which are embedded therein and have their ends terminating adjacent to but inwardly from the walls of the slit 3. As shown in Figures 3, 4 and 5 these members can be in the form of spring rods which are arcuate and are regularly spaced apart in parallel planes. If desired, however, and as shown in Figure 6, the members can be made of spring bands 6 similarly disposed within the body 7 of soft rubber.

In using this device the walls of the slit 3 are spread apart a sufficient distance to permit the convenient insertion of the tail T of the cow within the opening 2. The walls of this opening need not tightly grip the tail although the device can be proportioned to grip the tail with a light pressure if so desired. The essential part of the invention resides in the use of the rounded portions 4 merging into the walls of the slit 3 so that when the spread holder is released, after being placed about the tail and astride the back portion of the leg of the cow close to and above the hock, said holder can be released so that the straddled portion of the leg will thus be gripped firmly and, consequently, the tail will be held against switching. It will be noted that the resilient members 5 are spaced apart within the body I so that the different parts of the body can be opened to different extents and can also close about the engaged hock to adapt the gripping faces or walls of slit 3 to irregularities in the contour of the engaged part and thus eliminate chafing such as would occur should the walls 4 be capable of yielding only uniformly. Under such conditions these gripping portions, if applied to a protuberance on the hock would not prevent the holder from rocking on the protuberance. However by so constructing the holder that it can flex in the direction of the length of the slit, it will fit snugly about any such protuberance and thus prevent relative movement of the holder on the hock engaged thereby. This flexibility also enables the holder to adapt itself to variations in the thickness of the engaged part of the tail, as well as to variations in the thickness of the bone at the hock.

The soft rubber permits the holder to be used without causing discomfort and it also serves to protect the resilient metal reenforcement from the action of the weather.

The holder can be kept clean easily because it is formed in but one piece and obviously it can be readily handled for the purpose of placing it in or removing it from position. Furthermore it is adaptable to tails and legs of different sizes.

What is claimed is:

A cow tail holder including a tubular body formed of soft resilient material, there being a slit extending longitudinally of the opening and from said opening to the outer surface of the body, opposed walls of the slit diverging inwardly along curved lines and merging into opposed portions of the wall of the opening, and separate independently flexible spring means embedded within the body and extending around the opening to points adjacent to opposed walls of the slit, said body being constructed to flex longitudinally and to open at the slit against the action of the spring means to receive the tail and a portion of the leg of a cow, the rounded walls of the slit constituting means for gripping the leg of the cow when the holder is released, said separate spring means operating independently to compress adjacent portions of the body about the engaged parts.

EDWIN ALBERT WODRICH.